(12) United States Patent
Iwashita (10) Patent No.: US 10,099,327 B2
(45) Date of Patent: Oct. 16, 2018

(54) DEVICE FOR PRESS-FITTING OIL SEAL

(71) Applicant: NISSAN MOTOR CO., LTD., Yokohama-shi, Kanagawa (JP)

(72) Inventor: Tetsunori Iwashita, Takatsuki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 174 days.

(21) Appl. No.: 14/423,332

(22) PCT Filed: Jul. 12, 2013

(86) PCT No.: PCT/JP2013/069144
§ 371 (c)(1),
(2) Date: Feb. 23, 2015

(87) PCT Pub. No.: WO2014/034299
PCT Pub. Date: Mar. 6, 2014

(65) Prior Publication Data
US 2015/0224613 A1 Aug. 13, 2015

(30) Foreign Application Priority Data

Aug. 28, 2012 (JP) ................................. 2012-187605

(51) Int. Cl.
*B23P 19/04* (2006.01)
*B23P 19/08* (2006.01)

(52) U.S. Cl.
CPC ......... *B23P 19/084* (2013.01); *Y10T 29/5383* (2015.01)

(58) Field of Classification Search
CPC .................... B23P 19/084; Y10T 29/5383

USPC ......... 29/255, 278, 252, 235, 253, 272, 282, 29/239, 238, 747; 269/21
See application file for complete search history.

(56) References Cited

U.S. PATENT DOCUMENTS

| | | | | |
|---|---|---|---|---|
| 3,694,894 A | * | 10/1972 | Jelinek ................ | B25B 27/0028 269/21 |
| 6,521,157 B2 | * | 2/2003 | Watanabe .............. | B23P 15/24 156/212 |
| 6,702,268 B1 | * | 3/2004 | Nascimben ............ | B23Q 1/032 269/21 |

(Continued)

FOREIGN PATENT DOCUMENTS

JP      11-333639 A      12/1999

*Primary Examiner* — David Bryant
*Assistant Examiner* — Nirvana Deonauth
(74) *Attorney, Agent, or Firm* — Foley & Lardner LLP

(57) ABSTRACT

A device for press-fitting an oil seal S that includes a fixing section F in which a hard ring S is embedded and a lip section L into a structure A. The device includes an air hammer AH that includes a hammer head 1. The hammer head 1 includes a pressing section 6 configured to abut the fixing section F and a holding section 7 configured to abut the lip section L, and a negative pressure space 8 is formed between the hammer head AH and the oil seal S between the pressing section 6 and the holding section 7. The hammer head 1 is provided with an air suction path 11 that is open to the negative pressure space 8 at one end and is connected to an air suctioning means 10 at the other end. Accordingly, the device holds by suction the oil seal S having a complicated shape without deforming it, and adequately press-fits it into a structure A.

6 Claims, 5 Drawing Sheets

(A)

(B)

(56) References Cited

U.S. PATENT DOCUMENTS

| | | | | |
|---|---|---|---|---|
| 7,527,271 | B2* | 5/2009 | Oh | B24B 37/30 269/21 |
| 7,597,774 | B2* | 10/2009 | Muramoto | B32B 37/0015 156/285 |
| 7,603,767 | B2* | 10/2009 | Goko | B25B 11/005 29/740 |
| 7,618,030 | B2* | 11/2009 | Yonezawa | F15B 15/068 269/24 |
| 2005/0060875 | A1* | 3/2005 | Etling | B21K 25/00 29/724 |
| 2009/0307892 | A1* | 12/2009 | Hashimoto | B23P 19/084 29/446 |
| 2010/0038863 | A1* | 2/2010 | Nakagawa | F16J 15/3268 277/549 |
| 2010/0089255 | A1* | 4/2010 | Shimao | B29C 43/36 100/35 |

* cited by examiner

DEVICE FOR PRESS-FITTING OIL SEAL

TECHNICAL FIELD

The present invention relates to a device for press-fitting an oil seal that is used for, for example, press-fitting an oil seal into a structure such as a crankcase in an automobile engine assembly line.

BACKGROUND ART

A conventional press-fitting device of this kind is described in, for example, Patent Document 1. The press-fitting device of Patent Document 1 is used to press-fit a cylindrical piece into an opening of a sleeve. The cylindrical piece includes a large diameter part that is to be press-fitted into the sleeve, an intermediate flange and a small diameter part.

The press-fitting device includes a negative pressure introduction hole and a tail axis having a support hole. The press-fitting device is configured to hold the cylindrical piece by suction in a position such that the small diameter part is inserted in the support hole and a negative pressure is applied on the flange. Then, the press fitting device is configured to move the tail axis forward while holding the cylindrical piece by suction, so as to press-fit the cylindrical piece into the opening of the sleeve.

CITATION LIST

Patent Literature

Patent Document 1: Japanese Patent Unexamined Publication No. Hei11-333639

SUMMARY OF INVENTION

Technical Problem

The above-described conventional press-fitting device can adequately hold a cylindrical piece by suction when the cylindrical piece is made of a hard material such as metal and also has a simple shape. However, it has been difficult to use the conventional press-fitting device for press-fitting an oil seal because pieces such as oil seals that have an outer part made of a soft material and have a complicated shape are easily deformed and is therefore often difficult to hold by suction.

The present invention was made in consideration of the above-described circumstance, and an object thereof is to provide a device for press-fitting an oil seal that can reliably hold the oil seal having a complicated shape by suction without deforming it and can adequately press-fits the oil seal into a structure.

Solution to Problem

The device for press-fitting an oil seal of the present invention is a device for press-fitting into a structure an oil seal that includes a fixing section in which a hard ring is embedded and a lip section that protrudes at either outer or inner circumferential side of the fixing section.

The press-fitting device includes an air hammer including a hammer head for carrying the oil seal. The hammer head of the air hammer includes a pressing section configured to abut the fixing section of the oil seal and a holding section configured to abut the lip section of the oil seal. Further, the hammer head is configured to form a negative pressure space between the hammer head and the oil seal between the pressing section and the holding section. In the hammer head, the press-fitting device further includes an air suction path that is open to the negative pressure space at one end and is connected to an air suctioning means at the other end. The above-described configuration serves as means for solving the problem with the prior art.

Advantageous Effects of Invention

With the above-described configuration, the device for press-fitting an oil seal of the present invention can reliably hold the oil seal having a complicated shape by suction without deforming it, and can therefore adequately press-fit the oil seal into a structure.

BRIEF DESCRIPTION OF DRAWINGS

FIG. 1 is: (A) a cross sectional view of a hammer head; and (B) a cross sectional view of an oil seal, which illustrate an embodiment of the device for press-fitting an oil seal of the present invention.

EMBODIMENTS OF INVENTION

Hereinafter, an embodiment of the device for press-fitting an oil seal of the present invention will be described referring to the drawings.

Figure 1:
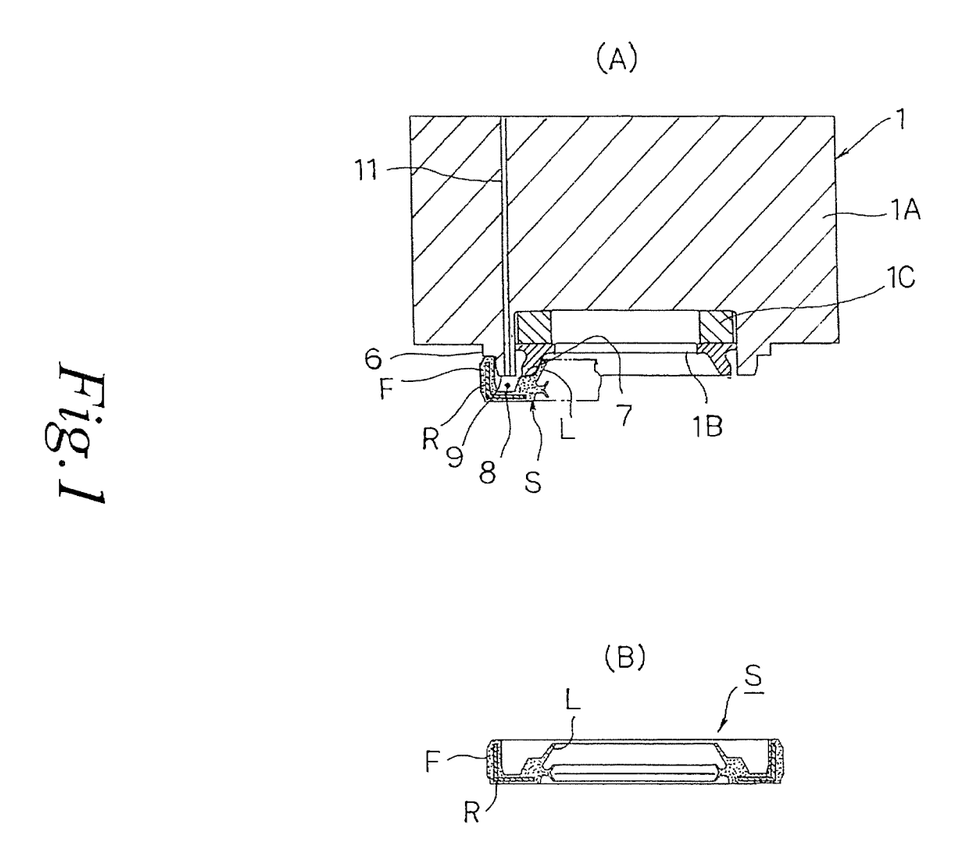
Figure 2:
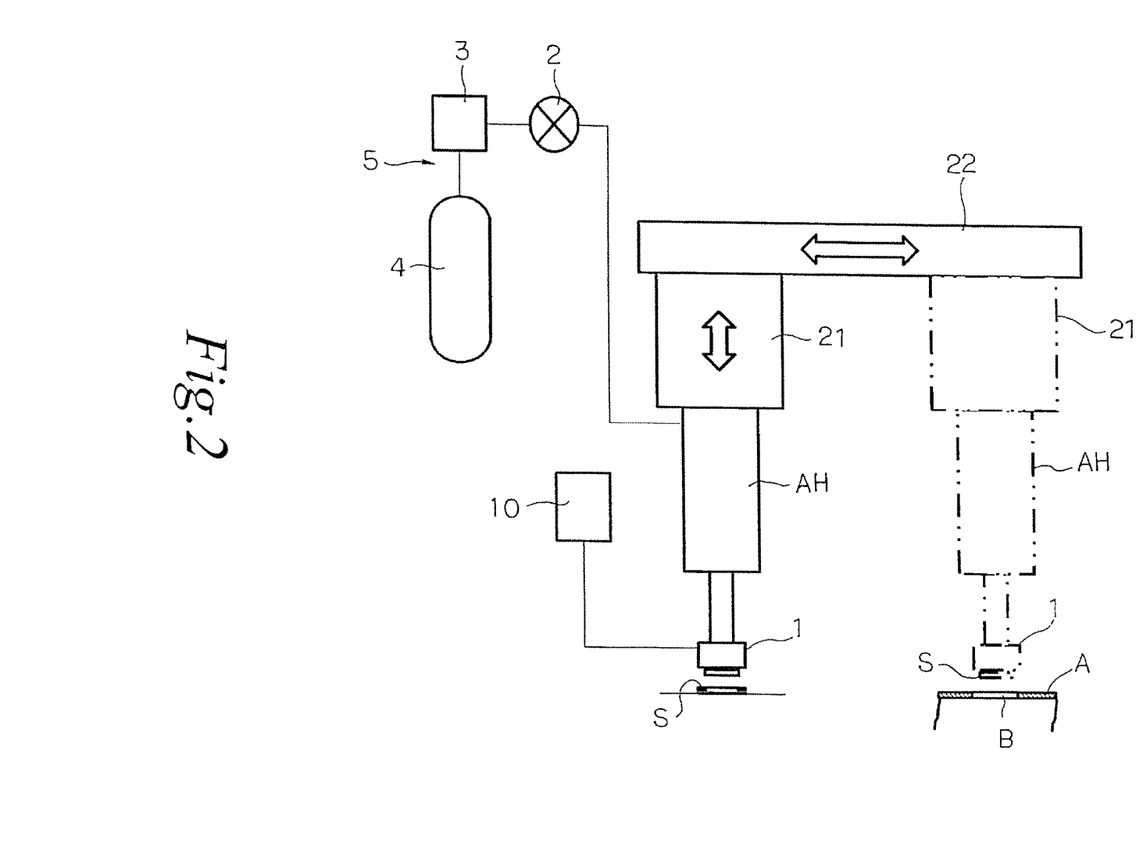
FIG. 2 is an explanatory view illustrating the whole configuration of the device for press-fitting an oil seal.

The device for press-fitting an oil seal as illustrated in FIG. 1 and FIG. 2 is intended for an oil seal S that includes a fixing section F in which a hard ring R is embedded and a lip section L that protrudes at either inner or outer circumferential side of the fixing section F. Further, the oil seal S is intended to be press-fitted into a structure A.

The press-fitting device of the embodiment is configured to press-fit the oil seal S into a through hole for a crankshaft of a crankcase of automobile engines. That is, in FIG. 2, the structure A is a crankcase, and the oil seal S is press-fitted into the through hole B of the crankcase.

As illustrated in FIG. 1 (B), the oil seal S includes the fixing section F in which the hard ring R having a L-shaped cross section is embedded and the lip section L that protrudes at the inner circumferential side thereof over the whole circumference. The fixing section F and the lip section L define the approximately U-shaped cross section of the oil seal S. The hard ring R is made of stainless steel, and the oil seal is made of synthetic rubber.

The press-fitting device includes an air hammer AH that includes a hammer head 1 for carrying the oil. The air hammer AH in the figure is placed such that the hammer head 1 faces downward and the axis is in the vertical direction. The air hammer AH, which has a basic configuration conventionally known in the art, is driven by a driver device 5 that includes a valve 2, a regulator 3, an air supply device (air cylinder) 4 and the like.

The hammer head 1 of the device for press-fitting an oil seal includes a pressing section 6 configured to abut the fixing section F of the oil seal S and a holding section 7 configured to abut the lip section L of the oil seal S. A negative pressure space 8 is formed between the hammer head 1 and the oil seal S between the pressing section 6 and the holding section 7.

In more detail, on the lower face of the hammer head 1, a circular downward step that serves as a pressing section 6, a circular downward protrusion 9 that protrudes downward at the inner side of the circular step and a holding section 7 that protrudes downward at the inner side of the circular protrusion 9 are disposed concentrically with each other. That is, the pressing section 6, the holding section 7 and the negative pressure space 8 are formed over the whole circumference.

In the embodiment, the oil seal S has an approximately U-shaped cross section as described above, and the U-shape is utilized to form the negative pressure space 8. When the oil seal S is attached to the hammer head 1, the circular protrusion 9 is inserted in the negative pressure space 8 as illustrated in the left part of FIG. 1 (A) where a part of the oil seal is depicted.

Further, in the hammer head 1 of the device for press-fitting an oil seal, an air suction path 11 is provided that is open to the negative pressure space 8 at the one end and is connected to the air suctioning means 10 at the other end. The air suctioning means 10 is constituted by, for example, a vacuum pump. The air suction path 11 is formed parallel to the axis of the hammer head 1, and one end (lower end) thereof is open at the tip of the circular protrusion 9. Accordingly, when the oil seal S is attached to the hammer head 1, the end (lower end) of the air suction path 11 is open to the negative pressure space 8.

Further, in the device for press-fitting an oil seal of the embodiment, the hammer head 1 includes a holding member 1B that includes the holding section 7 and is divided from the head body 1A and an adjusting member 1C that is interposed between the head body 1A and the holding member 1B. The adjusting member 1C is interposed between the head body 1A and the holding member 1B in the axis direction of the hammer head 1, i.e. in the vertical direction. In the embodiment, the holding member 1B and the adjusting member 1C are made of resin, and the hardness of the resin of the adjusting member 1C is lower than that of the holding member 1B.

Further, the device for press-fitting an oil seal includes an air hammer moving means 21 and an air hammer positioning means 22. The air hammer moving means 21, which may be constituted by, for example, a hydraulic cylinder, moves the air hammer AH forward and backward along the axis thereof. In the embodiment, since the hammer head H faces downward, a forward movement of the air hammer AH corresponds to a descending movement, and a back movement corresponds to an ascending movement.

The air hammer positioning means 22 moves and holds the air hammer AH to the setting position of the oil seal S and the setting position of the structure A as illustrated in FIG. 2. The air hammer positioning means 22 may be constituted by, for example, a driving mechanism that includes a hydraulic cylinder and a ball screw. That is, the air hammer positioning means 22 moves the air hammer AH back and forth between the setting position of the oil seal S illustrated by the solid line in FIG. 2 and the setting position of the structure A illustrated by the virtual line in FIG. 2.

Next, operation of the device for press-fitting an oil seal will be described referring to FIG. 3 to FIG. 5. The states of (A) to (D) of FIG. 3 and (A) to (D) of FIG. 4 correspond to Steps 1 to 8 of the timing chart of FIG. 5 respectively.

Figure 3:
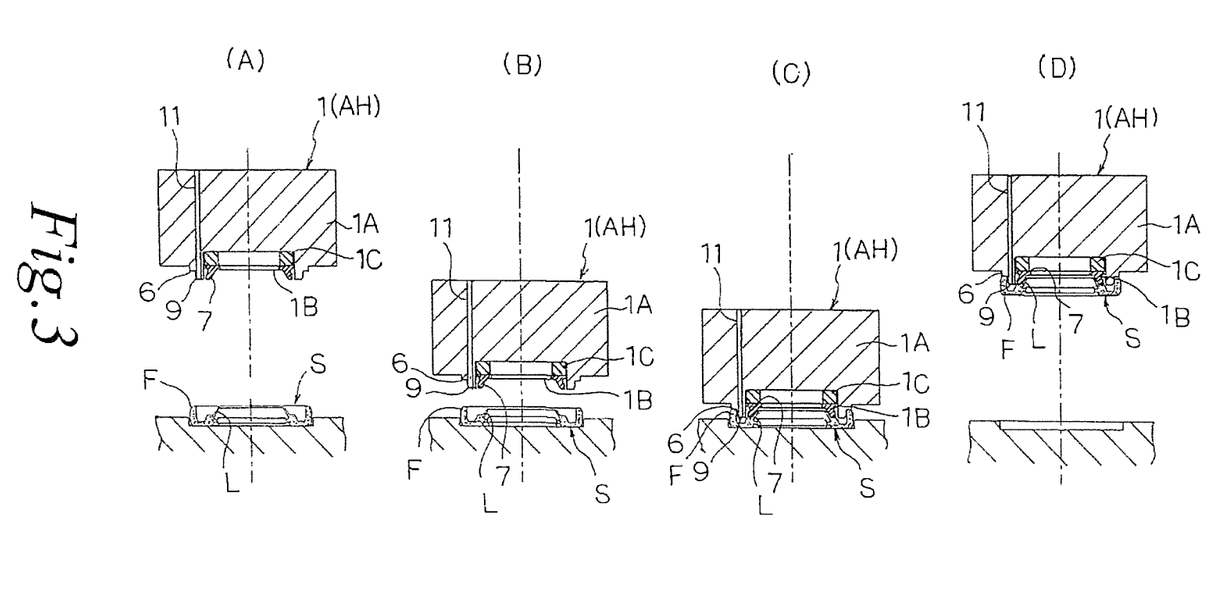
FIG. 3 is: (A) to (D) sectional views of the main part for describing a carrying process of the oil seal.
Figure 5:
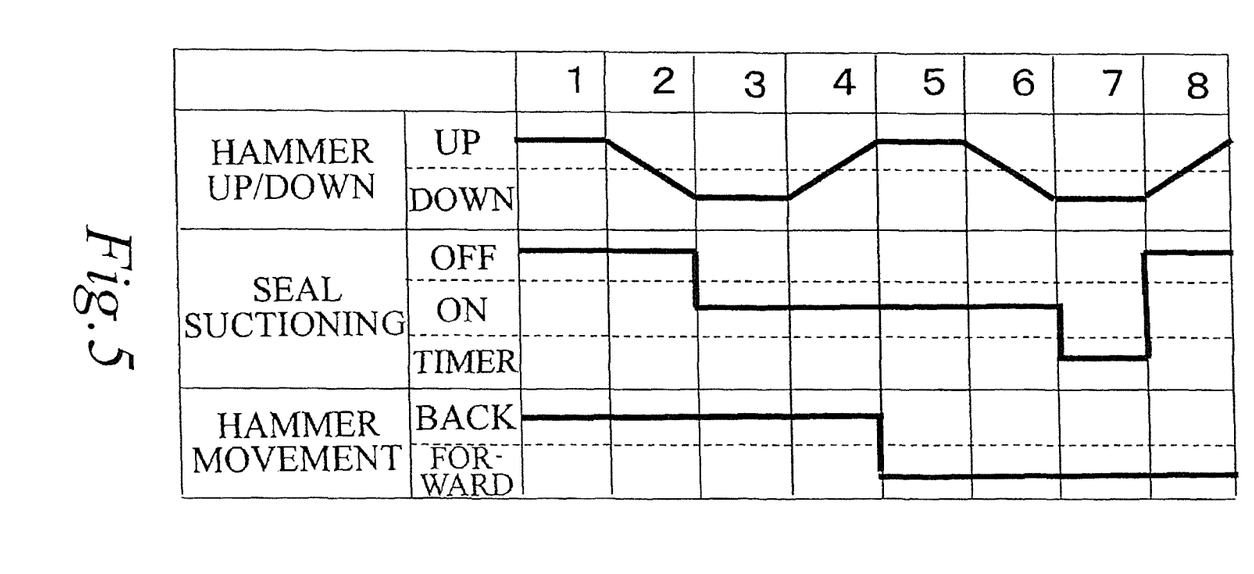
FIG. 5 is a timing chart illustrating the operation of an air suctioning means, an air hammer moving means and an air hammer positioning means.

As illustrated in FIG. 3 (A) and Step 1 of FIG. 5, the press-fitting device moves the hammer head 1 so that the hammer head 1 at an upper position is opposed to the mounted oil seal S. Then, as illustrated in FIG. 3 (A) and Step 2 of FIG. 5, the air hammer moving means 21 moves down (forward) the hammer head 1. In this step, the air suctioning means (seal suctioning in FIG. 5) 10 is off.

Next, in the press-fitting device, when the hammer head 1 reaches its lowest position as illustrated in FIG. 3 (C), the pressing section 6 and the holding section 8 of the hammer head 1 respectively come in contact with the fixing section F and the lip section L of the oil seal S over the whole circumferences as illustrated in the left part of FIG. 1 (A). Thereafter, as illustrated in Step 3 of FIG. 5, the press-fitting device turns on the air suctioning means 10.

Then, in the hammer head 1, the air in the negative pressure space 8 is suctioned through the air suction path 11, and the oil seal S is suctioned and held by the action of the generated negative pressure. Thereafter, as illustrated in FIG. 3 (D) and Step 4 of FIG. 5, the press-fitting device moves the hammer head 1 up (back) while holding the oil seal S by suction.

Figure 4:
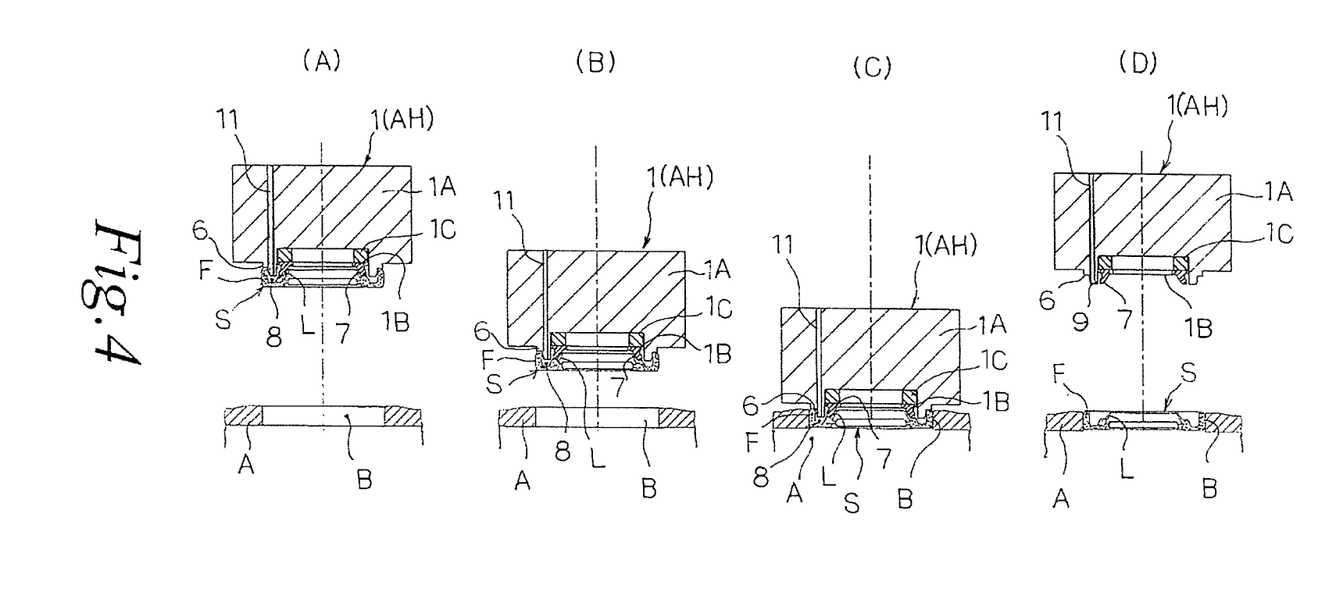
FIG. 4 is: (A) to (D) sectional views of the main part for describing a press-fitting process of the oil seal.

Next, as illustrated in FIG. 3 (D), FIG. 4 (A) and Steps 4 and 5 of FIG. 5, the press-fitting device allows the air hammer positioning means 22 to move the air hammer AH from the setting position of the oil seal S to the setting position of the structure A (from the back position to the forward position in the hammer movement of FIG. 5).

Thereafter, as illustrated in FIG. 4 (B) and Step 6 of FIG. 5, the press-fitting device moves down the hammer head 1. When the hammer head 1 reaches the lowest position as illustrated in FIG. 4 (C), the air hammer AH is operated to press-fit the oil seal S into the through hole B of the structure A. That is, the pressing section 6 of the hammer head 1 presses the fixing section F where the hard ring R is embedded so that the press-fitting device press-fits the oil seal S into the through hole B.

In this step, as illustrated in Step 7 of FIG. 5, the press-fitting device starts a timer of the air suctioning means 10 so as to keep it on-state for a predetermined time. In this way, the press-fitting condition is stabilized so that the oil seal S fits the through hole B well. After the predetermined time, the air suctioning means 10 is turned off. Then, as illustrated in FIG. 4 (D) and Step 8 of FIG. 5, the press-fitting device moves up the hammer head 1 and completes the current press-fitting process. After moving the air hammer AH back to the original position as illustrated by the solid line in FIG. 1, the press-fitting device starts the next press-fitting process.

In the press-fitting device that carries and press-fits the oil seal S as described above, the hammer head 1 does not have any member configured to engage with the inner side of the oil seal S, but the hammer head 1 holds the oil seal S by suction such that the pressing section 6 and the holding section 7 of the hammer head 1 abut the fixing section F and lip section L of the oil seal S, respectively. Therefore, there is no risk of twist or deformation of the lip section L.

Further, in the press-fitting device, the negative pressure space 8 is formed between the hammer head 1 and the oil seal S over the whole circumference, and the pressure of the negative pressure space 8 is reduced in order to hold the oil seal S by suction. Therefore, the oil seal S can be adequately held by suction.

In the above-described conventional press-fitting device, a negative pressure directly acts on the piece to be press-fitted. If such devices are used for a piece such as the oil seal S that has an outer part made of a soft material and has a complicated shape, only the suctioned part is held strongly, and the whole piece may be twisted. Further, if the axis of the device is in the vertical direction, it is required to apply the suction at plural points because the part that is not held by suction may hang down. This results in a complicated negative pressure introduction path.

In contrast, in the press-fitting device of the present invention, the negative pressure space 8 is utilized to hold the oil seal S by suction. Accordingly, only one air suction path 11 allows a negative pressure to act on the oil seal S over the whole circumference. This can simplify the negative pressure introducing path in the hammer head 1 of the press-fitting device. Furthermore, even when the axis of the hammer head 1 is in the vertical direction as illustrated in FIG. 1, the press-fitting device can reliably hold the oil seal S by suction.

In this way, the device for press-fitting an oil seal of the present invention can reliably hold the oil seal S having a complicated shape by suction without deforming it, and can adequately press-fit the oil seal S into the structure A.

Further, the above-described press-fitting device includes the hammer head 1 that includes the head body 1A, the holding member 1B and the adjusting member 1C made of a resin having a hardness lower than the holding member 1B. Therefore, the adjusting member 1C can absorb a collapse or a deformation of the oil seal S. As a result, the holding member 1B is constantly in close contact with the oil seal S, which can improve the function of holding the oil seal S by suction. Furthermore, it is possible to retain the high abrasion resistance of the holding member 1B that frequently comes in contact with the oil seal S.

Since the press-fitting device includes the air hammer moving means 21, it is possible to automate the carrying process and the press-fitting process of the oil seal S. Further, since the press-fitting device includes the air hammer positioning means 22, it is possible to convey the oil seal S from the carrying process to the press-fitting process. Furthermore, the combination with the air hammer moving means 21 enables applying the press-fitting device to a robot for an assembly line of automobile engines.

The configuration of the device for press-fitting an oil seal of the present invention is not limited to the above-described embodiment, and the details of the configuration may be suitably changed without departing from the gist of the present invention For example, in the embodiment, the oil seal S has an approximately U-shaped cross section, and this shape is utilized to form the negative pressure space 8. Instead, the hammer head 1 itself may be formed in a U-shape to form the negative pressure space.

Further, the device for press-fitting an oil seal of the present invention is intended for oil seals that have a lip section protruding at either inner or outer circumference side of a fixing section. Accordingly, in the case of the oil seal S of the embodiment, which has the lip section L at the inner side of the fixing section F, it is press-fitted into the through hole B of the structure A. In contrast, in the case of an oil seal that has a lip section at the outer side of a fixing section, it is press-fitted to the outside of a cylindrical part of a structure. Even in this case, the same functions and advantageous effects can be obtained, although the positional relationship of the pressing section and the holding section of the hammer head is reversed.

REFERENCE SIGNS LIST

AH air hammer
A structure
F fixing section
L lip section
R hard ring
S oil seal
1 hammer head
1A head body
1B holding member
1C adjusting member
6 pressing section
7 holding section
8 negative pressure space
10 air suctioning means
11 air suction path
21 air hammer moving means
22 air hammer positioning means

The invention claimed is:

1. A device for press-fitting an oil seal into a structure, said oil seal having, over a whole circumference thereof, a fixing section in which a hard ring is embedded and a lip section protruding at either of inner or outer circumferential sides of the fixing section, wherein:

said device comprises
an air hammer that comprises a hammer head configured to carry the oil seal, and
an air hammer mover that moves the air hammer forward and backward along an axis of the air hammer, which is placed such that the hammer head faces downward,
the oil seal has an approximately U-shaped cross-section defined by the fixing section and the lip section,
the hammer head of the air hammer comprises, over the whole circumference of the oil seal, a pressing section configured to abut an upper face of the fixing section of the oil seal and a holding section that protrudes downward and is configured to abut an upper face of the lip section, and a negative pressure space is formed between the hammer head and the oil seal between the pressing section and the holding section,
the hammer head is provided with an air suction path that is open to the negative pressure space at one end and is connected to an air suction at another end,
the air suction is configured to suction and hold the oil seal, such that the oil seal is suctioned and held by forward movement of the hammer head by the air hammer mover, and
the air hammer mover is configured to move forward so as to press-fit the oil seal which is suctioned and held with the hammer head into the structure.

2. The device for press-fitting the oil seal according to claim 1, wherein
the hammer head comprises a holding member that comprises the holding section and is divided from a head body, and an adjusting member that is interposed between the head body and the holding member, and
the adjusting member is made of a resin that has a hardness lower than a hardness of the holding member.

3. The device for press-fitting the oil seal according to claim 1, further comprising:
an air hammer driver that moves and holds the air hammer to a setting position of the oil seal and a setting position of the structure.

4. A device for press-fitting an oil seal into a structure, said oil seal having, over a whole circumference thereof, a fixing section in which a hard ring is embedded and a lip section protruding at either of inner or outer circumferential sides of the fixing section, wherein:

said device comprises an air hammer that comprises a hammer head configured to carry the oil seal, and an air hammer moving means that moves the air hammer forward and backward along an axis of the air hammer, which is placed such that the hammer head faces downward, the oil seal has an approximately U-shaped cross-section defined by the fixing section and the lip section, the hammer head of the air hammer comprises, over the whole circumference of the oil seal, a pressing section configured to abut an upper face of the fixing section of the oil seal and a holding section that protrudes downward and is configured to abut an upper face of the lip section, and a negative pressure space is formed between the hammer head and the oil seal between the pressing section and the holding section, the hammer head is provided with an air suction path that is open to the negative pressure space at one end and is connected to an air suctioning means at another end, the air suctioning means suctions and holds the oil seal, such that the oil seal is suctioned and held by forward movement of the hammer head by the air hammer moving means, and the air hammer moving means moves forward so as to press-fit the oil seal which is suctioned and held with the hammer head into the structure.

5. The device for press-fitting the oil seal according to claim 4, wherein the hammer head comprises a holding member that comprises the holding section and is divided from a head body, and an adjusting member that is interposed between the head body and the holding member, and the adjusting member is made of a resin that has a hardness lower than a hardness of the holding member.

6. The device for press-fitting the oil seal according to claim 4, further comprising:

an air hammer positioning means that moves and holds the air hammer to a setting position of the oil seal and a setting position of the structure.

* * * * *